United States Patent [19]

Vassiliades

[11] 4,303,719

[45] Dec. 1, 1981

[54] CHROMOGENIC COPY SYSTEM

[76] Inventor: Anthony E. Vassiliades, 8738 Tanager Woods Dr., Cincinnati, Ohio 45242

[21] Appl. No.: 173,254

[22] Filed: Jul. 29, 1980

[51] Int. Cl.$^3$ .......................... B32B 5/16; B41L 1/20

[52] U.S. Cl. .................................. 428/207; 282/27.5; 427/150; 427/151; 427/152; 427/261; 428/211; 428/307; 428/342; 428/537; 428/914

[58] Field of Search ............... 282/27.5; 428/306, 411, 428/537, 914, 307, 207, 211, 342; 427/150, 151, 261, 152

[56] References Cited

U.S. PATENT DOCUMENTS

| | | | |
|---|---|---|---|
| 3,427,180 | 2/1969 | Phillips | 282/27.5 |
| 3,448,207 | 1/1970 | Vassiliades | 358/288 |
| 3,672,935 | 6/1972 | Miller et al. | 282/27.5 |
| 3,723,156 | 3/1973 | Brockett et al. | 282/27.5 |
| 3,819,396 | 7/1974 | Vincent et al. | 428/306 |
| 3,864,146 | 2/1975 | Oda et al. | 282/27.5 |
| 3,871,900 | 3/1975 | Hayashi et al. | 282/27.5 |
| 3,900,669 | 8/1975 | Kirtani | 282/27.5 |
| 3,934,070 | 1/1976 | Kimura et al. | 428/411 X |
| 3,937,864 | 2/1976 | Kohmura et al. | 428/411 |
| 3,983,292 | 9/1976 | Saito et al. | 428/537 X |
| 4,234,212 | 11/1980 | Kato et al. | 282/27.5 |
| 4,239,815 | 12/1980 | Kato et al. | 282/27.5 X |
| 4,260,179 | 4/1981 | Yamaguchi et al. | 428/914 |

*Primary Examiner*—Thomas J. Herbert, Jr.
*Attorney, Agent, or Firm*—Sigalos & Levine

[57] ABSTRACT

A pressure-sensitive chromogenic copy system utilizing a color developer capable of reacting with a chromogen to form a color image, said color developer comprising sulfur, sulfonyl, or sulfone derivatives of substituted aromatic carboxylic acids, preferably hydroxybenzoic acids.

9 Claims, No Drawings

CHROMOGENIC COPY SYSTEM

BACKGROUND OF THE INVENTION

This invention relates to color developing materials used in carbonless copying systems and to receptor sheets and carbonless copying system comprising a substrate bearing said materials in a coating composition.

Copy systems employing chromogenic materials are well known. Such systems usually comprise microcapsules that contain a colorless chromogen (i.e., leuco dye) dissolved in a solvent. The microcapsules form a coating on the back or underside of a sheet of paper called a "transfer sheet" or CB (coated back) sheet. The transfer sheet is superimposed over a "receptor sheet" or CF (coated front) sheet, having a color developer for the chromogenic compound coated onto the front thereof. When the microcapsules containing the chromogen(s) are subjected to localized pressure, e.g., typewriter, ballpoint pen, or thelike, they are ruptured and the chromogenic material is released and transferred onto the underlying receptor sheet where it reacts with the color developer. The color developer is an electron acceptor substance such as an acid activated clay, or a low molecular weight phenol-formaldehyde resin. Such pressure sensitive copying system may include additional sheets interposed between the top sheet (CB) and the bottom sheet (CF). The interposed sheets are coated on their backside with chromogencontaining microcapsules and on their front side with a color developer. These sheets are known on CFB (coated front and back) sheets. As used herein, the term "transfer sheet" includes any substrate bearing a coating of electron accepting material and includes CF and CFB sheets as previously described.

Chromogenic compounds comprising colorless dye intermediates are conventional. Exemplary of the colorless dye intermediates which are contemplated for use in this invention are leuco dyes such as crystal violate lactone (CVL), derivatives of bis(p-dialkylaminoaryl) methane, dilactones, ureido fluorans, and bisfluorans such as disclosed in U.S. Pat. Nos. 2,981,733, 2,981,738, 3,819,396, and 3,821,010. These dye intermediates are colorless in a neutral or alkaline medium and react to form a visible color in an acidic medium. Thus, when a capsule containing such a compound is ruptured and the compound is discharged onto an absorbent, acidic, electron-acceptor material, such as a paper web coated with an organic or inorganic acid material, a visible color appears on the absorbent material at the point of contact.

Heretofore, pressure-sensitive copy systems have employed acidic clays, and more recently, oil soluble phenolic resins and/or their metal salts as the receptor materials as disclosed in U.S. Pat. Nos. 3,672,935, 3,723,156 and 3,427,180. Receptor sheets employing acidic clays and phenolic resins as the electron acceptor substances have major disadvantages. For example, images formed on acidic clays are succeptible to deterioration due to heat, moisture and light upon prolonged exposure to atmospheric conditions. Furthermore, acidic clays present severe rheological problems such as extremely high viscosities and dewatering during the preparation of the coating formulation and the application of said coating formulation to the paper web. Additionally, papers coated with acidic clays are highly abrasive and have a tendency to yellow severely upon aging. The oil-soluble phenolic resins offer some improvement over the acidic clays such as improved resistance to moisture, but they too have major drawbacks. For example, prolonged exposure of receptor coatings containing phenolic resins to heat and/or light causes the "splitting off" of phenolic groups and results in an overall degradation of the resin. Such degradation of the resin is reflected in yellowing of the coated sheets, fading of the formed image, and loss of image-forming ability of the receptor sheet. Furthermore, the presence of such free phenolic groups present environmental and health hazards.

The use of certain aromatic carboxylic acids as electron acceptors or color developers in carbonless copying systems is also known. For example, U.S. Pat. Nos. 3,488,207, 3,871,900, 3,934,070, and 3,983,292 disclose the use of such aromatic carboxylic acids and/or their metallic salts as reactive materials for chromogens. These aromatic carboxylic acids are capable of developing images which are superior in intensity and stability to those formed by acidic clays and phenolic resins. Several of these aromatic carboxylic acids, however, present severe problems such as extremely high viscosities and excessive foaming during the preparation of the coating solution and the application of said solution to the web. These problems render the use of such materials impractical in large scale, commercial manufacturing operations. Furthermore, several of these aromatic carboxylic acids possess some undesirable features such as, slow rate of reaction with the chromogen, low sublimation point resulting in an unstable receptor sheet, and form images of low intensity and stability.

SUMMARY OF THE INVENTION

It has now been discovered that a highly reactive, aesthetically attractive and extremely stable receptor sheet can be provided which eliminate the problems of the prior art.

Briefly stated, the present invention comprises a pressure-sensitive chromogenic copy system comprising a transfer sheet having on at least one surface thereof a color developer capable of reacting with a chromogen to form a color image, said color developer comprising a compound having the general formula:

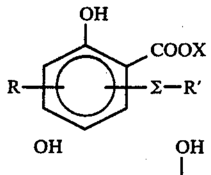 ;

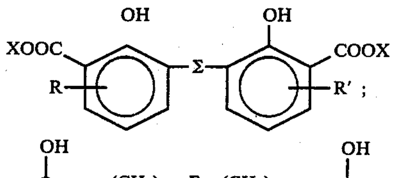 ;

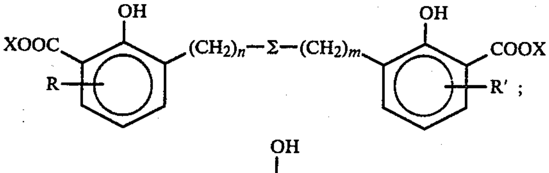 ;

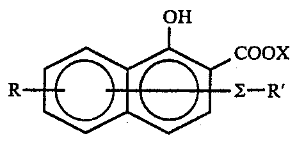 ; or

-continued

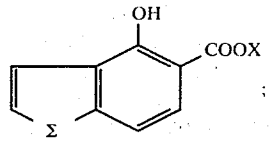

wherein R and R' is each a hydrogen atom, a $C_1$–$C_{20}$ radical, or an aryl group; X is hydrogen or a metallic ion; Σ is a sulfur atom, or a sulfonyl or sulfone radical; n is O or an integer of 1 to 20; and m is an integer of 1 to 20.

DETAILED DESCRIPTION

While any of the substituted thiohydroxy carboxylic acid or metallic salt color developers noted above can be utilized, it is preferred to use the thiohydroxy benzoic acids such as 2-hydroxy-4-methyl-5-isobutyl thiobenzoic acid; 2-hydroxy-5-isobtyl thiobenzoic acid; 2-hydroxy-5-butyl thiobenzoic acid; or the metallic salts thereof. The sulfonyl and sulfone derivates of each of the structures noted can be prepared by the conventional procedure of progressive oxidation of the sulfur group. The metals used to form the salts are those conventionally employed for this purpose such as zinc, aluminum, and the monovalent alkali metal salts.

Any of the noted color developers can be formulated in several different ways to provide coated receptor sheets which possess the desirable properties of high speed of image formation, high image intensity, excellent stability upon exposure to atmospheric conditions, ease of preparation and application of the coating solution, and elimination of environmental and health hazards during their preparation and use. Furthermore, the various modes of formulating the materials of the present invention allow these materials to be coated onto paper webs at high coating speeds and low coating weights, resulting in economically attractive copying systems.

Another major advantage of the materials of the present invention is the "amphoteric" type of behavior they exhibit during the preparation of the coating solutions. Heretofore, receptor sheets containing aromatic carboxylic acids required the neutralization of the acid with an alkali during the preparation of the coating solution. Several of the components of a coating solution such as binders, extenders and other additives can be adversely affected by changes in the pH of the system. The surprising discovery of the amphoteric nature of the materials of the present invention allows the formulation of these materials under any pH condition, i.e., acidic, neutral, or alkaline thus offering a wider flexibility in selecting the other coating components of the coating solution.

The color developers utilized in the present invention can be used in the same proportions as conventional color developers.

They can be formulated in several different ways depending upon the mode of application and the desired properties of the end product. For example, in using conventional paper coaters, such as air-knife, gate-roll, blade, reverse roll, and the like, these materials can be formulated in a water medium using conventional adhesives (binders) such as partially or fully hydrolyzed polyvinyl alcohols, natural or modified starches, latexes, proteins, gums, and the like. Optionally, in the water-based formulations, inorganic or organic extending materials such as carbonates, inert clays (such as kaolins and bentonites) may be used to extend the surface of the active ingredients. Alternatively, the materials of the present invention can be formulated into "fountain solutions" or "inks" using water-miscible solvents such as alcohols and ketones, or water-immiscible solvents such as xylene, toluene, benzene, mineral seal oil, alkylated naphthalenes, and the like.

The "fountain solutions" and "inks" may be applied to the web on commercial printing presses using various printing methods such as wet and dry offset, and direct letter presses and like conventional equipment.

In still another mode of application, receptor sheets can be produced by mixing the materials of the present invention with pulps of wood fibers and formed into a paper web, thus avoiding completely the coating step.

The invention will be further described in connection with the examples that follow, which are set forth for purposes of illustration only.

EXAMPLE 1

An initial solution was prepared by dissolving 0.1 moles of 2-hydroxy-4-methyl-5-isobutyl thiobenzoic acid (active material) in 10 grams of water containing 0.1 moles of NaOH (solution pH=7). This solution was mixed with another solution containing 55 grams of water, 15 grams of ethylated starch (Penik and Ford's Pencote), and 30 grams of hydrated alumina (Reynold Chemicals' Paperad). The final solution was coated onto a paper web at a coating weight of 3.5 gms/$m^2$ to form a receptor sheet (CF). A CB sheet coated with CVL-containing microcapsules was superimposed on this receptor sheet. Localized pressures on the CB sheet produced quick, brilliant blue images on the receptor sheet which images remained unchanged after several days of exposure to strong sunlight. Furthermore, the exposed sheet did not show any signs of deterioration, such as yellowing, and new images formed on it were quick and of high color intensity.

EXAMPLE 2

Example 1 was repeated, but the pH of the initial solution was adjusted to 6 with glacial acetic acid. Identical results were obtained.

EXAMPLE 3

Example 1 was repeated, but the pH of the initial solution was adjusted to 10 with ammonium hydroxide. Identical results were obtained.

EXAMPLE 4

Example 1 was repeated, but the active material used was 0.1 moles of 3.3'-thio bis(2-hydroxy-5 methyl) benzoic acid. Identical results were obtained.

EXAMPLE 5

Example 1 was repeated, but 0.1 mole of 2-hydroxy, 5-butylsulfonyl benzoic acid was substituted for the thiobenzoic acid used therein. Similar results were obtained.

EXAMPLE 6

Solution A was prepared by dissolving 0.05 moles of 2-hydroxy-5-butyl thiobenzoic acid in 25 gms of isopropanol, 5 gms of water and 1.7 gms of $LiOH.H_2O$. A second solution (B) was prepared by admixing 65 gms of an aqueous, 5% by weight of Vinol-540 (Airco's 88% hydrolyzed polyvinyl alcohol) solution, 50 gms of a 15% by weight aqueous ethylated starch solution, 10 gms of a 4% by weight aqueous solution of low viscosity carboxymethyl-cellulose, and 100 gms of hydrated alumina. Solutions A and B were thoroughly mixed and coated onto a paper web at a coating weight of 2.2 gm/m$^2$ to form a receptor sheet. When this receptor sheet was imaged in a manner similar to that described in example 1, all results obtained were identical.

EXAMPLE 7

Example 6 was repeated, but the hydrated alumina in solution B was replaced with equal weight of ZnO. Identical results were obtained.

EXAMPLE 8

Example 7 was repeated, but the isopropyl alcohol was replaced with an equal amount of acetone. Identical results were obtained.

EXAMPLE 9

A solution was prepared by dissolving 5 gms of hydroxyethylcellulose in 50 gms of ethanol, and 50 gms of water containing 5 gms of ammonium hydroxide and 6 gms of $ZnSO_4$. To this solution, 10 gms of 2-hydroxy-5-isobutyl thiobenzoic acid were dissolved. The final solution was coated onto a paper web at a coating weight of 1 gm/m$^2$ and dried. The receptor sheet and the images formed on it possessed properties similar to those described in example 1.

EXAMPLE 10

0.1 moles of 2-hydroxy-4-methyl-5-isobutyl thiobenzoic acid and 0.1 moles of zinc octoate were dissolved in 100 gms of xylene, coated onto a paper web at a coating weight of 1 gm/m$^2$ and dried. The resultant receptor sheet possessed all the properties described in example 1.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A pressure-sensitive chromogenic copy system comprising a transfer sheet having on at least a portion of at least one surface thereof a color developer capable of reacting with a chromogen to form a color image, said color developer comprising a compound having the general formula:

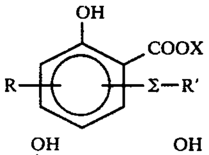
;

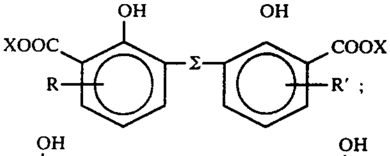
;

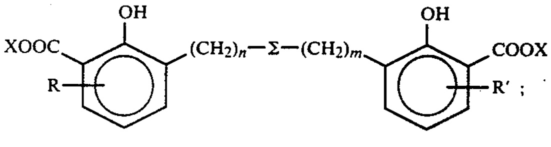
;

-continued

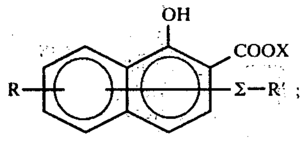
; or

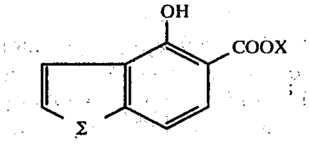

wherein R and R' is each a hydrogen atom, a $C_1$–$C_{20}$ alkyl radical, or an aryl group, X is hydrogen or a metallic ion, Σ is a sulfur atom, or a sulfonyl or sulfone radical, n is 0 or an integer of 1 to 20, and m is an integer of 1 to 20.

2. The pressure-sensitive chromogenic copy system of claim 1 wherein the color developer has the general formula:

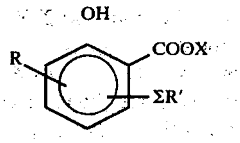

wherein R is a hydrogen atom or a methyl radical, X is hydrogen or a metallic ion, and Σ-R is an isobutyl thio or butyl thio radical.

3. The pressure-sensitive chromogenic copy system of claims 1 or 2 wherein the color developer is selected from 2-hydroxy-4-methyl-5-butyl thiobenzoic acid; 2-hydroxy-5-isobutyl thiobenzoic acid; the metallic salts thereof; or mixtures thereof.

4. A receptor sheet for a pressure-sensitive chromogenic copy system comprising a substrate having on at least a portion of one surface thereof a color developer capable of reacting with a chromogen to form color images, said color developer comprising a compound having the general formula:

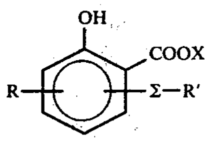
;

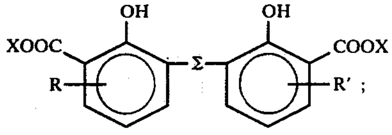
;

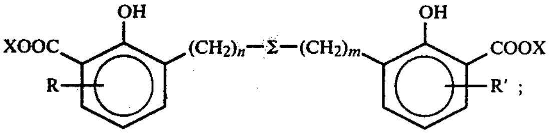
;

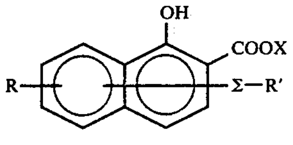
; or

-continued

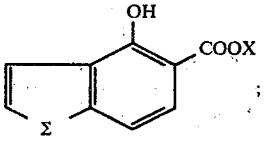

;

wherein R and R' is each a hydrogen atom, a $C_1$–$C_{20}$ alkyl radical, or an aryl group, X is hydrogen or a metallic ion, Σ is a sulfur atom, or a sulfonyl or sulfone radical, n is 0 or an integer of 1 to 20, and m is an integer of 1 to 20.

5. The receptor sheet of claim 4 wherein the color developer has the general formula:

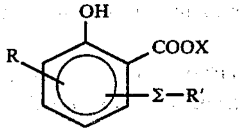

wherein R is a hydrogen atom or a methyl radical, X is hydrogen or a metallic ion, and Σ-R is an isobutyl thio or butyl thio radical.

6. The receptor sheet of claims 4 or 5 wherein the color developer is selected from 2-hydroxy-4-methyl-5-butyl thiobenzoic acid; 2-hydroxy-5-isobutyl thiobenzoic acid; the metallic salts thereof; or mixtures thereof.

7. A coated front and back sheet for a pressure-sensitive chromogenic copy system comprising a substrate having on at least a portion of one surface thereof a coating of chromogen-containing microcapsules and on at least a portion of the other surface thereof a coating of a color developer capable of reacting with said chromogen to form color images, said color developer comprising a compound having the general formula:

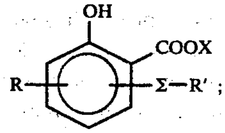

;

-continued

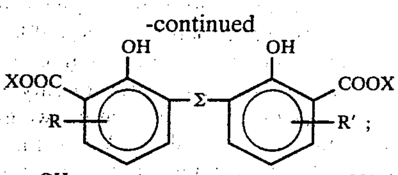

;

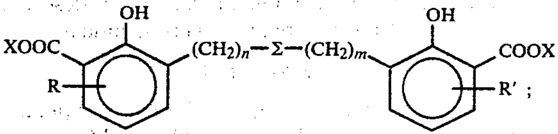

;

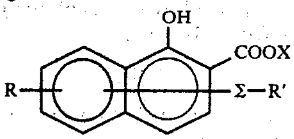

; or

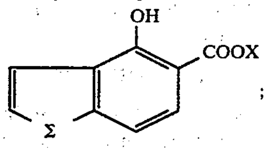

;

wherein R and R' is each a hydrogen atom, a $C_1$–$C_{20}$ alkyl radical, or an aryl group, X is hydrogen or a metallic ion, Σ is a sulfur atom, or a sulfonyl or sulfone radical, n is 0 or an integer of 1 to 20, and m is an integer of 1 to 20.

8. The coated front and back sheet of claim 7 wherein the color developer has the general formula:

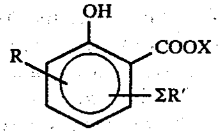

wherein R is a hydrogen atom or a methyl radical, X is hydrogen or a metallic ion, and Σ-R is an isobutyl thio or butyl thio radical.

9. The coated front and back sheet of claims 7 or 8 wherein the color developer is selected from 2-hydroxy-4-methyl-5-isobutyl thiobenzoic acid; the metallic salts thereof; or mixtures thereof.

* * * * *